July 18, 1961

W. N. POUNDSTONE 2,992,723

EXTENSIBLE BELT CONVEYOR

Filed Nov. 22, 1957

INVENTOR.
WILLIAM N. POUNDSTONE
BY
*Stanley J. Price*
HIS ATTORNEY

INVENTOR.
WILLIAM N. POUNDSTONE
BY Stanley J. Prince
HIS ATTORNEY

July 18, 1961

W. N. POUNDSTONE 2,992,723

EXTENSIBLE BELT CONVEYOR

Filed Nov. 22, 1957

INVENTOR.
WILLIAM N. POUNDSTONE
BY
Stanley J. Price
HIS ATTORNEY

July 18, 1961  W. N. POUNDSTONE  2,992,723
EXTENSIBLE BELT CONVEYOR
Filed Nov. 22, 1957  5 Sheets-Sheet 4

INVENTOR.
WILLIAM N. POUNDSTONE
BY
HIS ATTORNEY

July 18, 1961 W. N. POUNDSTONE 2,992,723
EXTENSIBLE BELT CONVEYOR
Filed Nov. 22, 1957 5 Sheets-Sheet 5

INVENTOR.
WILLIAM N. POUNDSTONE
BY
HIS ATTORNEY

United States Patent Office 2,992,723
Patented July 18, 1961

2,992,723
EXTENSIBLE BELT CONVEYOR
William N. Poundstone, Morgantown, W. Va., assignor to Consolidation Coal Company, Pittsburgh, Pa., a corporation of Pennsylvania
Filed Nov. 22, 1957, Ser. No. 698,273
12 Claims. (Cl. 198—139)

This invention relates to an extensible endless belt conveyor mechanism and more particularly to an extensible endless belt conveyor mechanism having an improved discharge terminus and extensible belt storage means.

In mechanized mining operations employing endless belt conveyors, considerable difficulty is encountered in installing, extending and dismantling the belt conveyor. This is particularly true where the discharge terminus of the belt is elevated so that the material conveyed may be discharged directly into track mounted mining cars. Conventional endless conveyor belt mechanisms include a loading terminus and discharge terminus with the conveyor reach and return reach of the endless conveyor belt suitably supported therebetween. The conventional discharge terminus has both the conveyor belt drive mechanism and the head pulley positioned on a unitary supporting frame structure. The discharge terminus is unwieldy and requires considerable effort and manpower to transport it to various sections of the mine. Added problems arise when the discharge terminus is elevated so that the conveyed material may discharge directly into track mounted mine cars. To position the drive mechanism in an elevated position a cribbing type platform is usually constructed to support the elevated drive mechanism. Often special equipment is required to raise the drive mechanism onto the platform. Further labor is required to brace and properly secure the discharge terminus on the platform. The heretofore described steps in assembling the conventional belt conveyor limits its flexibility and hence limits its potential usefulness as a means to convey material underground. This is particularly true in mining operations where frequent shifts of production equipment to various sections of the mine are dictated by variations in the quality of the products desired.

My improved conveyor mechanism is flexible and easily assembled and dismantled so that it can be moved to various sections of the mine with a minimum of time and labor. One of the contributing factors to the flexibility of my conveyor mechanism is the separation of the head pulley from the drive mechanism. In my conveyor mechanism a bridging structure carries the head pulley in an elevated position to discharge the conveyed material directly into a track mounted mine car and the belt drive mechanism is positioned on the mine floor. This arrangement eliminates the cribbing type platform and materially reduces assembly time. The space formerly occupied by the cribbing platform is now available to store strands of belting that may be easily added to the conveying system to increase the length of the conveying reach.

Accordingly, the principal object of my invention is to provide a flexible, easily transportable extensible conveyor belt mechanism.

Another object of my invention is to provide a conveyor mechanism with the head pulley detached from and in spaced relation to the belt drive mechanism.

Another object of my invention is to provide a conveyor mechanism having an elevated discharge terminus with the belt drive mechanism positioned on the mine floor.

A further object of my invention is to provide an arch or bridge structure that carries the conveyor mechanism head pulley.

Another object of my invention is to provide a means to adjust the conveyor mechanism head pulley to train the conveyor belt.

These and other objects and advantages of this invention will be more completely disclosed and described in the following specification, the accompanying drawings and the appended claims.

Figure 1:
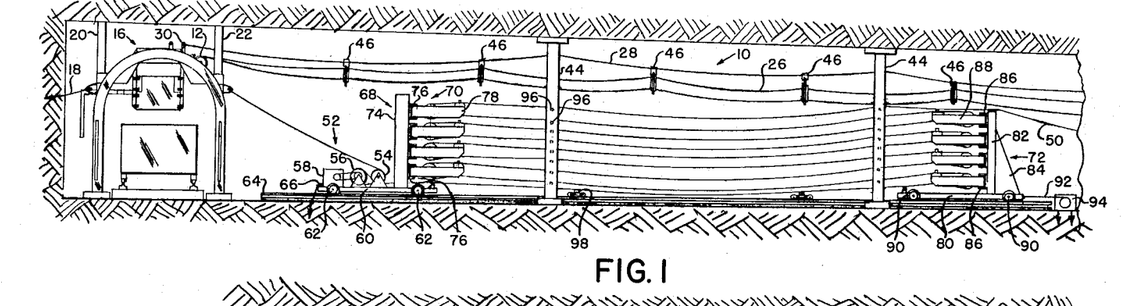
FIGURE 1 is a view in side elevation of the discharge terminus of my conveyor mechanism and illustrating the extensible portion of the conveyor belt in its retracted position.
Figure 2:
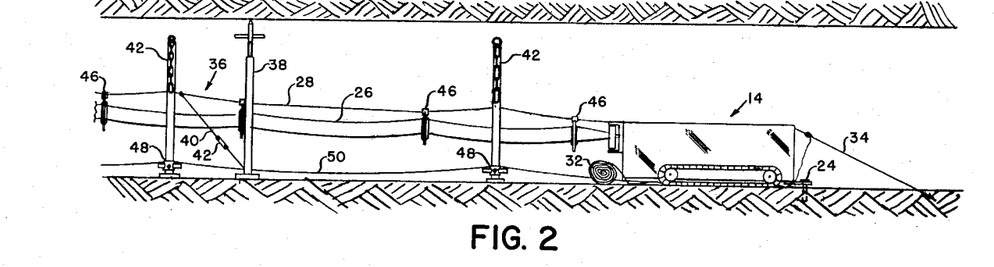
FIGURE 2 is a view in side elevation of the loading terminus and tailpiece of my conveyor mechanism.

Referring to the drawings and particularly FIGURES 1 and 2 there is illustrated a conveyor mechanism having a conveyor belt generally designated by the numeral 10 supported at its discharge end or discharge terminus by a head pulley 12 and at its loading end or loading terminus by a tailpiece 14. The head pulley 12 is operatively carried by a bridging structure 16 that is secured to the mine wall by an anchoring cable 18 and to the mine roof by posts 20 and 22. The tailpiece 14 (FIGURE 2) is a track mounted, self-propelled device that may be constructed to advance or retract under its own power. The tailpiece 14 has an anchoring means 24 arranged to penetrate the mine floor and maintain the tailpiece 14 in a fixed position relative to the bridging structure 16. When it is desired to move the tailpiece 14 the anchoring means 24 is first removed from the mine floor and the tailpiece 14 is then advanced or retracted as desired.

The conveyor belt 10 has a conveying reach 26 that is supported between the tailpiece 14 and the bridging structure 16 by means of a pair of spaced flexible strands 28. The flexible strands 28 are secured at one end to the bridging structure 16 at 30 and extend along the sides of the conveying reach 26 to the tailpiece 14. The flexible strands 28 are laced through a pair of sheaves (not shown) on the tailpiece 14 and terminate in spools 32. The portions of the flexible strands 28 in the spools 32 are arranged to be pulled into the conveying system around the tailpiece sheaves as the belt conveyor is extended. The flexible strands 28 are maintained in tension by anchoring means 34 on the material receiving end of the tailpiece 14. Additional tensioning members 36 may also be employed. The tensioning members 36 include an adjustable post 38 that is wedged between the mine roof and mine floor. A cable 40 is secured to the adjustable post 38 and to the flexible strands 28. The cable 40 is tensioned by means of a turnbuckle 42 which in turn tensions the spaced flexible strands 28.

Figure 3:
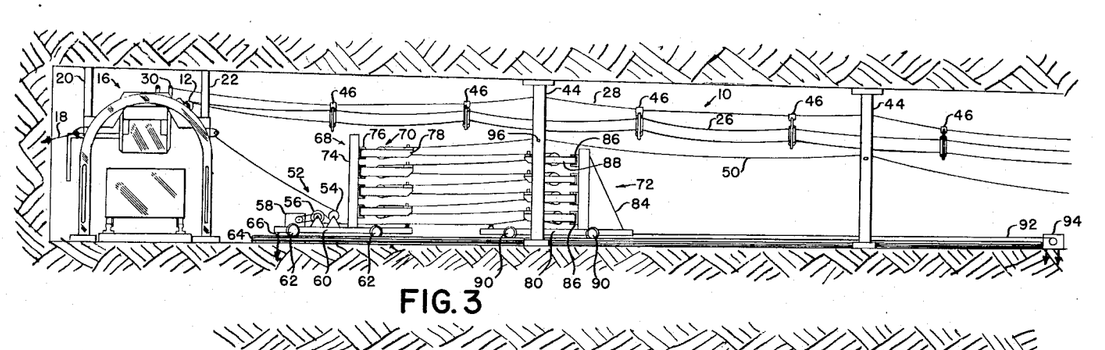
FIGURE 3 is a view in side elevation similar to FIGURE 1 illustrating the extensible portion of the conveyor belt in its extended position.
Figure 4:
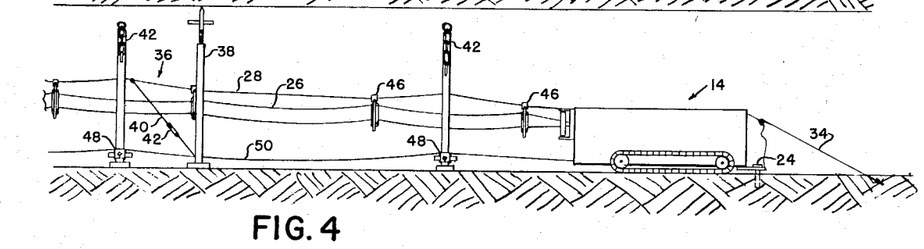
FIGURE 4 is a view similar to FIGURE 2.
Figures 5, 6:
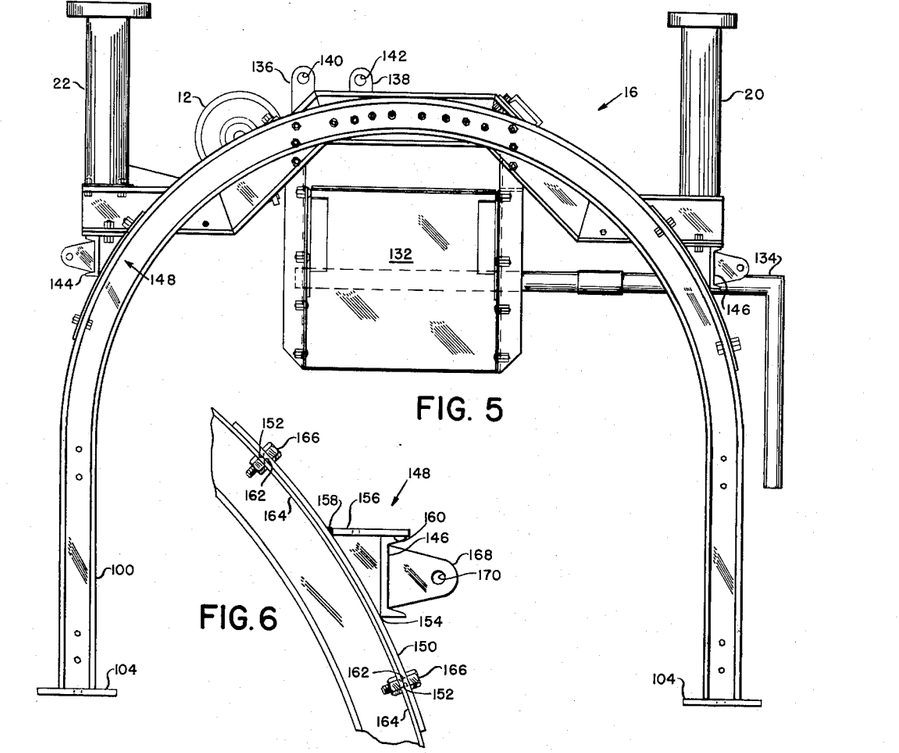
FIGURE 5 is a view in side elevation of the arch structure supporting the head pulley.
FIGURE 6 is an enlarged fragmentary view in side elevation of one of the head pulley frame supporting channels.

The spaced flexible strands 28 and the conveying reach 26 have a section that slopes upwardly toward the head pulley 12. This sloping section is illustrated in FIGURES 1 and 3.

The spaced flexible strands 28 are supported at predetermined intervals along their lengths by means of stands 42 and posts 44. The stands 42 are employed where the conveying reach 26 remains substantially horizontal (FIGURE 2), and the posts 44 are employed where the conveying reach 26 is inclined toward the head pulley 12. Between the spaced stands 42 and the posts 44 troughing idler rollers 46 are secured to the flexible strands 28 and support the conveying reach 26 therebetween. The stands 42 also have idler rollers 48 adjacent their lower portions which are arranged to support the return reach 50 of the conveyor belt 10.

A conveyor belt drive mechanism generally indicated by the numeral 52 is arranged to pull the conveyor belt 10 around the head pulley 12. The drive mechanism 52 includes a pair of drive rollers 54 and 56 and a power means 58. The drive rollers 54 and 56 and the power means 58 are mounted on a frame structure 60 that, in turn, is mounted on flanged wheels 62. The entire drive mechanism 52 is then mounted on tracks 64 which are substantially parallel to the conveyor belt 10. The frame structure 60 has an anchoring means 66 that is arranged to secure the frame 60 in a fixed position relative to the bridging structure 16.

Positioned under the elevated portion of the conveyor belt 10 is a belt storage means generally indicated by the numeral 68. The belt storage means 68 includes a pair of belt storage clusters 70 and 72 with strands of the extensible portion of the conveyor belt 10 laced therethrough. The storage cluster 70 has a vertical carrier member 74 secured to the conveyor drive mechanism frame 60 and extending upwardly therefrom. The vertical carrier member 74 has a plurality of pin type hinges 76 extending horizontally therefrom (FIGURES 1 and 3). The pin type hinges 76 each have self training pulley assemblies 78 hingedly secured thereto. The pulley assemblies 78 are hingedly fixed to the vertical support member 74 and are movable horizontally relative thereto.

The storage cluster 72 has a base frame member 80 with a vertical carrier member 82 extending upwardly therefrom. A reinforcing plate 84 is secured to both the base member 80 and the vertical carrier member 82 to maintain the carrier member 82 in fixed vertical position on the base 80. The vertical carrier 82 is similar to the carrier 74 and has a plurality of pin type hinges 86 extending horizontally therefrom. Other self training pulley assemblies 88 are hingedly connected to the vertical carrier 82 by means of the hinges 86 and are movable horizontally relative to the carrier 82.

The storage cluster base member 80 is also mounted on flange type wheels 90 which in turn are positioned on the tracks 64 so that the storage cluster 72 is movable longitudinally beneath the conveyor belt 10 toward and away from frame structure 60. Connected at one end to the base 80 there is a flexible cable 92 that is connected to a winch structure 94. The winch structure 94 is fixedly secured to the mine floor by means of anchors or the like and is adapted to reel in or pay out the cable 92.

As previously described, the storage cluster 70 is secured to the mine floor by anchoring means 66 and the storage cluster 72 is movable toward and away from the storage cluster 70. The cable 92, which is connected to the winch structure 94 and the storage cluster 72, is adapted to regulate the distance between the storage clusters 70 and 72. The cable 92 and winch structure 94 also tension the portion of the conveyor belt 10 that is laced around the pulleys of the storage clusters 70 and 72. With this arrangement as the tailpiece 14 is advanced, the winch 94 pays out cable 92 and the storage cluster 72 moves toward the storage cluster 70. As the storage cluster 72 moves toward the storage cluster 70 the length of the conveyor belting laced between the cluster is reduced and the cumulative length of belting is fed into the active portion of the conveyor belt thus increasing the length of the conveying reach. To reduce the length of the conveying reach 26, the reverse procedure is followed. As the tailpiece 14 is moved toward the discharge terminus 16 the winch structure 94 reels in cable 92 and moves the storage cluster 72 away from the storage cluster 70. The length of the loops of belting between the storage clusters 70 and 72 is increased and the length of the conveying reach 26 is cumulatively decreased. It should be noted that the conveyor belt 10 is an endless strand of belting and, although it is stated that lengths of belting are added to or removed from the conveying reach 26 in extending or retracting the conveyor mechanism, the belt 10 remains an endless strand and the active portion of the belt is either increased or decreased.

When the conveyor belt 10 is in its retracted position as illustrated in FIGURE 1, idler rollers 96 are positioned between the spaced posts 44 to support the strands of conveyor belt 10 between the storage clusters 70 and 72. There are also provided idler rollers 98 which are mounted on flanged wheels and are supported by the tracks 64. The idler rollers 98 prevent the lowest strand of the extensible portion of the belt from being frayed by the cross ties that support the tracks 64.

The arch structure generally designated by the numeral 16 is illustrated in detail in FIGURES 5, 6, 7, 8, 9 and 10. The arch structure 16 includes a pair of arch like side members 100 and 102 which will hereinafter be referred to as arch members 100 and 102. Base members 104 are secured to the free ends of the arch members 100 and 102 and are adapted to rest on the mine floor with the arch structure 16 bridging other conveying means.

The arch members 100 and 102 are maintained in spaced parallel relation to each other by means of horizontal connecting members 106 and 108. The connecting members 106 and 108 are detachably secured to the web portions of the arch members 100 and 102 so that the arch structure 16 may be easily dismantled and moved to a new location. Diagonal stringers 110 and 112 reinforce the connecting members 106 and 108.

Figure 7:
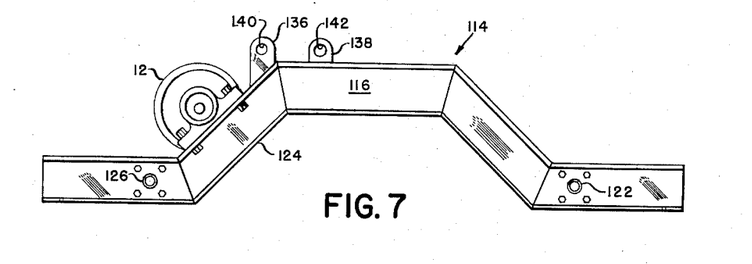
FIGURE 7 is a view in side elevation of the head pulley frame member.
Figure 9:
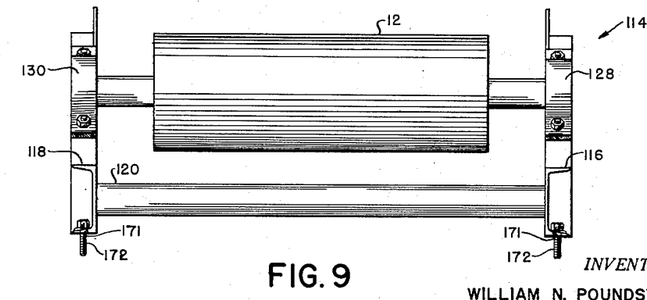
FIGURE 9 is a view in front elevation of the head pulley frame member.
Figure 10:
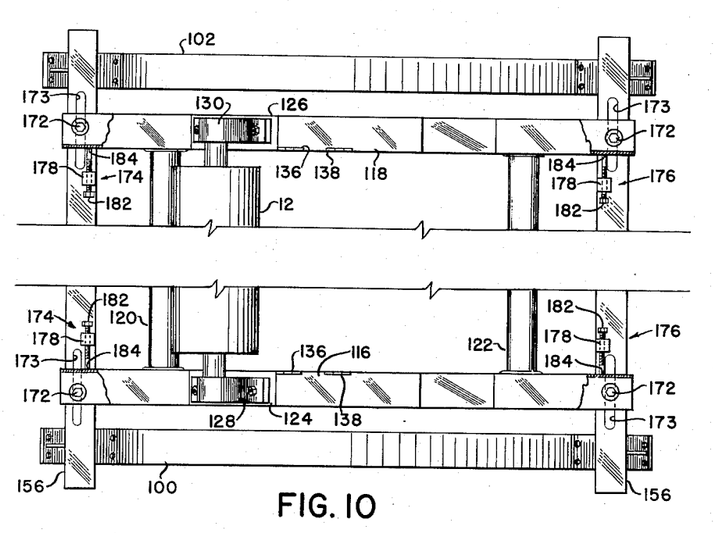
FIGURE 10 is a top plan view of the arch structure with the head pulley frame member in assembled position.

A head pulley frame member illustrated in FIGURES 7, 9 and 10 and generally designated by the numeral 114 is arranged to be supported from the upper portion of the arch members 100 and 102. The head pulley frame member 114 has a pair of channel like side members 116 and 118 that are maintained in spaced parallel relation to each other by a pair of tubular cylindrical connecting members 120 and 122. The connecting members 120 and 122 are spaced inwardly from the end portions of the frame side members 116 and 118. The frame side members 116 and 118 have inclined intermediate portions 124 and 126 that are arranged to carry the bearing block members 128 and 130. The head pulley 12 is operatively supported in the bearing block members 128 and 130 in spaced relation to the transverse cylindrical connecting member 120 so that the conveyor belt 10 may pass around the head pulley 12 without contacting any of the bridging structure other than the head pulley 12. The head pulley frame member also carries a conventional flygate chute 132 in proper spaced relation with the head pulley 12. With this arrangement the material discharged from the belt 10 as it passes around the head pulley 12 enters the flygate chute 132 from which it may be channeled in predetermined directions. The flygate chute 132 includes an arm member 134 which extends beyond the arch members 100 and 102. The arm member 134 has a depending handle portion that is provided as a means to actuate the flygate chute 132.

Secured to the head pulley frame 114 are two pairs of upwardly extending plates designated 136 and 138 respectively. The plates have pairs of apertures 140 and 142 therethrough. The apertures 140 are adapted to receive the flexible strands 28 and the apertures 142 are employed as a coupling means to which an overhead cable may be attached to lift the head pulley frame 114 into proper position on the arch members 100 and 102.

The head pulley frame member 114 is supported in an elevated position by a pair of channel members 144 and 146. The channel members 144 and 146 each have a pair of securing assemblies generally designated by the numeral 148 (see FIGURE 6) adjacent their respective end portions. The securing assemblies 148 each have a curved plate member 150 with a plurality of apertures therethrough. The web portion of the channels 144 and 146 are secured adjacent their lower end as at 154 to the outer surface of the curved plate 150 by means of a weld or the like so that the top flange of the channels 144 and 146 extend in a horizontal plane. The channels 144 and 146 each have a plate member 156 positioned longitudinally along their top flange. The plate 156 is secured at its rear edge to the outer surface of the respective curved plates 150 adjacent their ends as at 158. The respective plates 156 are secured to the upper flange of the respective channels 144 and 146 as at 160. The arch members 100 and 102 have apertures 162 in their outer flanges 164. When the securing assemblies 148 are properly positioned on the outer surface of the respective arch member outer flanges 164 the arch member apertures 162 are aligned with the securing assembly apertures 152. Bolts 166 maintain the securing assemblies 148 in fixed relation on the arch member outer flanges 164.

The channel members 144 and 146 each have a pair of plates 168 extending outwardly therefrom with apertures 170 therethrough. Tensioning cables or guy wires 18 are connected to the arch structure 16 at the plates 168 to thereby secure the arch structure 16 to the mine walls.

Figure 8:
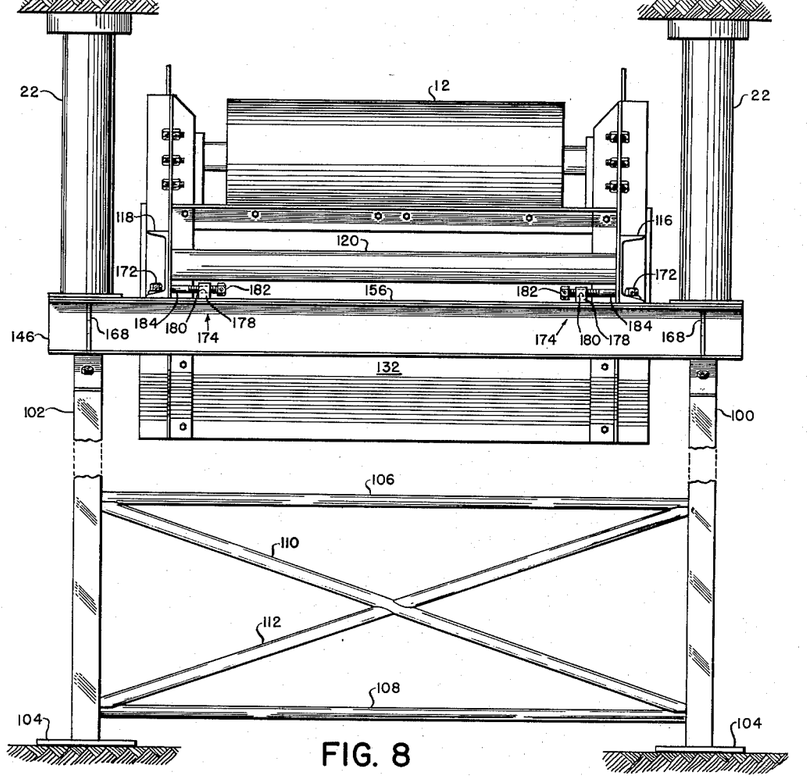
FIGURE 8 is a view in front elevation of the arch structure illustrated in FIGURE 5.

As illustrated in FIGURES 8, 9 and 10 the head pulley frame 114 is narrower than and has a smaller lateral dimension than the dimension between the spaced arch members 100 and 102. The head pulley frame member 114 is positioned between the arch members 100 and 102 with the head pulley frame side members 116 and 118 resting on the transverse channels 144 and 146. The head pulley frame member 114 is maintained in fixed relation on the transverse channels 144 and 146 by means of a plurality of bolts 172 (FIGURES 8 and 10) that extend through apertures 171 in the lower flange of the head pulley frame side members 116 and 118 and through slotted apertures 173 in the plates 156 that are secured to the channels 144 and 146.

The plates 156 each have a pair of head pulley frame adjusting members generally indicated by the numerals 174 and 176. The adjusting members 174 and 176 include a block member 178 secured to the plate 156 adjacent the web of the head pulley frame side members 116 and 118. The block members 178 have horizontal threaded apertures 180 therethrough (FIGURE 8) which are adapted to receive threaded adjusting screws 182. The screws 182 have their end portions 184 abutting the vertical web portion of the head pulley frame side members 116 and 118. By adjusting the screws 182 it is possible to move or adjust the entire head pulley frame member 114 relative to the arch members 100 and 102. This adjusting feature now makes it possible to center the conveying belt 10 on the head pulley 12 after the arch structure 16 has been assembled and secured in position relative to the mine walls and roof. Thus the post members 20 and 22 may be wedged between the plates 156 and the mine roof; and the cables or guy wires 18 may be connected to the mine wall to provide a fixed discharge terminus for the conveyor. Any subsequent minute adjustment that is required to align the head pulley for proper training of the conveying and return reach may now be made with the adjusting mechanisms 174 and 176. The adjusting mechanisms 174 and 176 move the entire head pulley frame structure 114 relative to the rigid arch members 100 and 102 and the rigid transverse channels 144 and 146 to thus adjust the head pulley 12 and center the belt thereon.

Figure 11:
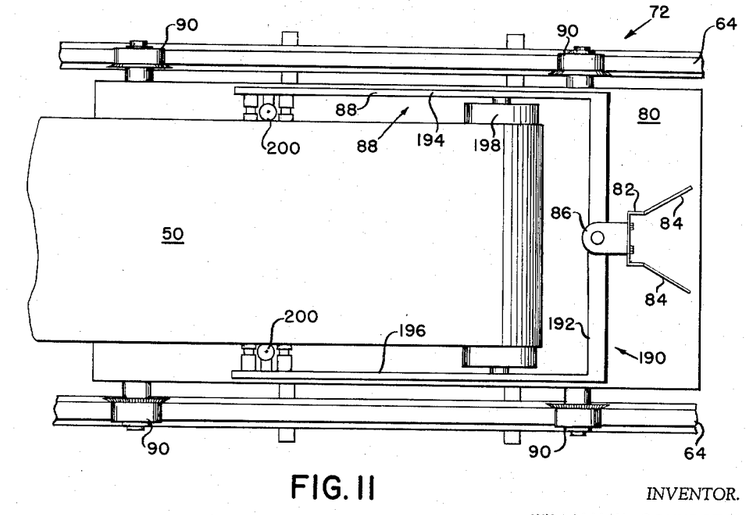
FIGURE 11 is a top plan view of one of the belt storage clusters illustrated in FIGURES 1 and 3.

FIGURE 11 illustrates in plan the storage cluster 72. The base member 80 is supported on a plurality of flanged wheels 90 that are positioned on tracks 64. The base 80 has a vertical carrier member 82 extending upwardly therefrom and has reinforcing plates 84 secured to the base 80 and carrier member 82 to maintain the carrier 82 in fixed vertical position on the base 80. The pin type hinges 86 are bolted to the vertical carrier 82 and extend horizontally therefrom. The self training pulley assemblies 88 include a yoke member 190 having a body portion 192 and a pair of parallel arm portions 194 and 196. The body portion 192 is connected to the carrier 82 by means of the hinges 86 so that the yoke 190 may pivot in a horizontal plane. An idler pulley 198 is connected between arms 194 and 196 and arranged to have the conveyor belt return reach 50 extend therearound. A plurality of vertical guides 200 are secured to arms 194 and 196 and maintain the conveyor belt return reach 50 therebetween.

OPERATION

The conveying mechanism heretofore described is portable and easily assembled, extended and dismantled in a minimum time with a minimum amount of labor. The storage clusters 70 and 72 and the drive mechanism 52 are bolted on flanged wheel base members so that they can be moved into position on wheels without having to load and unload these components from a carrier. The discharge terminus 16 is a lightweight, knock-down arch structure that supports both the head pulley 12 and the flygate chute 132 in proper position above another conveying means such as a track mounted mine car as illustrated in FIGURES 1 and 3. The following manner of assembly, extension and disassembly of the conveyor belt illustrates the flexibility that now permits frequent shifts of the conveying mechanism to various sections of the mine.

A. Assembly of the arch structure

The arch structure 16 is assembled by positioning the two arch members 100 and 102 in spaced parallel relation to each other and spanning the mine car haulageway. Connecting members 106 and 108 are then secured to the vertical legs of the arch members 100 and 102. The stringers 110 and 112 are also secured to the arch members 100 and 102. The transverse channels 144 and 146 are then secured to the external flanges of the arch members 100 and 102 by the securing means 148. The channels 144 and 146 and the plates 156 form a shoulder portion on which the free ends of the pulley frame side members 116 and 118 are secured. A block and tackle member is then secured in the apertures 142 of plates 138 and the head pulley frame member is elevated into operative position on the channels 144 and 146. Post members 20 and 22 are wedged between the mine roof and the plate 156 to anchor the arch structure 16. Guy wires 18 are then secured to the plates 168 and the adjacent mine wall to firmly anchor the arch structure in the mine haulageway. After the arch structure 16 is assembled the flexible strands 28 are secured to the plates 136 on the head pulley frame member 114 and are laced through the sheaves in the tailpiece 14. The flexible strands 28 are then tensioned by tensioning means 34 and 36. The strand supporting stands 42 and posts 44 are then positioned and secured to the spaced flexible strands 28. The troughing idlers are then secured to the strands 28 at predetermined spaced intervals. The storage clusters 70 and 72 are moved into position beneath the sloping section of the flexible strands 28. The endless conveyor belt 10 is first laced around a sheave in the tailpiece 14 and then around the head pulley 12. The conveyor belt 10 is then operatively laced around the drive rollers 54 and 56. The conveyor belt 10 is then laced around the alternate self training idler assemblies on the storage clusters 70 and 72 beginning with the lowermost idler assembly on the storage cluster 72 and terminating around the uppermost idler assembly on the storage cluster 70. The storage cluster 72 is then moved away from storage cluster 70 by means of winch 94 and cable 92 until the entire conveyor belt 10 is under proper tension. Further minute adjustments of the head pulley 12 are then made to properly center the conveying reach. This adjustment is accomplished by means of the adjusting screws 174. It is apparent from the above that a minimum of time and labor is required to assemble the conveying mechanism.

B. *Extending the conveyor belt*

As the mining operation advances the working face it is both highly desirable and, for efficient operation, necessary to advance the tailpiece 14 and the conveying reach 26 as the mining operation advances. To extend the conveyor reach the effective length of the flexible strands must be proportionately increased. To extend the flexible strands 28 the anchoring means 34 is released and the additional supply of the flexible strands contained in the spools 32 is pulled into the system around a sheave in the tailpiece 14 as the tailpiece advances. When the desired position of the tailpiece is reached, the anchoring means 34 again tensions the flexible strands 28. If necessary, additional tensioning means such as the post and tensioning cable tensioning means generally designated by the numeral 36 may also be installed. Concurrently with the advance of the tailpiece the tension on cable 90 is released so that the storage cluster 72 may advance toward storage cluster 70 and decrease the length of the storage loops between the storage clusters 70 and 72. The belt available from the decrease in length of the storage loops is available for the additional length of return reach and conveying reach required because of the tailpiece advancement. After sufficient belting has been added to the conveying reach and return reach the winch member 94 is actuated to move the storage cluster 72 away from the storage cluster 70 and properly tension the endless conveyor belt 10.

C. *Dismantling of the conveyor mechanism*

To dismantle the conveyor mechanism the anchoring and tensioning means 34 and 36 are removed and the flexible strands are disconnected from the arch structure 16. The conveyor belt 10 is broken adjacent the drive mechanism 52. The drive mechanism 52 is then energized and the belt 10 is then removed from the system and stored on a spool. The arch structure 16 is then easily dismantled by removing the head pulley frame member and the horizontal connecting members 106 and 108. The arch structure 16 in its dismantled condition may then be easily moved to a future conveying site and the storage clusters 72 and 74 may be moved to the new conveying site by means of tracks without loading and unloading the drive mechanism or the storage clusters onto and off of carrier members.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In an extensible belt conveyor the combination comprising a loading terminus, a discharge terminus, and an endless flexible conveyor belt extending between said termini, said conveyor belt having an upper conveying reach and a lower return reach, said discharge terminus having a head pulley in elevated position relative to said loading terminus with said conveyor belt extending therearound, said conveying reach having a section sloping upwardly toward said head pulley, belt storage means physically separated from said discharge terminus, said belt storage means positionable at variable distances from, and securable in fixed spaced relation to, said discharge terminus positioned beneath said conveying reach sloping section, said belt storage means including a plurality of loops in said return reach arranged to be payed out to increase the length of said conveying reach, and power operated belt driving means including belt engaging drive pulleys, said driving means being positionable at variable distances from said discharge terminus secured in fixed spaced relation to said discharge terminus, said belt driving means constructed and arranged to pull said conveyor belt around said head pulley.

2. In an extensible belt conveyor the combination comprising a loading terminus, a discharge terminus and an endless flexible conveyor belt extending between said termini, said conveyor belt having an upper conveying reach and a lower return reach, said discharge terminus having a head pulley in elevated position relative to said loading terminus with said conveyor belt extending therearound, said elevated head pulley arranged to discharge material from said conveyor belt into another conveying means positioned below said head pulley, said conveying reach having a section sloping upwardly toward said head pulley, belt storage means physically separated from said discharge terminus, said belt storage means positionable at variable distances from, and securable in fixed spaced relation to, said discharge terminus positioned beneath said conveying reach sloping section, said belt storage means including a first storage cluster secured in fixed spaced relation with said discharge terminus and a second storage cluster movably positioned relative to said first storage cluster, said storage cluster including a plurality of vertically spaced self training idler assemblies, said conveyor belt return reach laced around alternate idler assemblies on said storage clusters to form a plurality of storage loops in said return reach, means to move said second storage cluster toward said first storage cluster to thereby decrease the length of said storage loops and to increase the length of said conveying reach, and driving means including belt engaging drive pulleys for said conveyor belt, said driving means positionable at variable distances from, and securable in fixed spaced relation to, said discharge terminus secured between said discharge terminus and said first storage cluster, said driving means constructed and arranged to pull said conveyor belt around said head pulley.

3. In an extensible belt conveyor the combination comprising a movable self propelled loading terminus, an arch shaped discharge terminus and an endless flexible conveyor belt extending between said termini, said conveyor belt having an upper conveying reach and a lower return reach, said arch shaped discharge terminus having a head pulley in elevated position relative to said loading terminus with said conveyor belt extending therearound, said elevated head pulley arranged to discharge material from said conveyor belt into another conveying means positioned below said head pulley and between the depending legs of said arch shaped discharge terminus, said conveying reach having a section sloping upwardly toward said head pulley, belt storage means physically separated from said discharge terminus, said belt storage means positionable at variable distances from, and securable in fixed spaced relation to, said discharge terminus positioned beneath said conveying reach sloping section, said belt storage means including a first storage cluster secured in fixed spaced relation with said discharge terminus and a second storage cluster movably positioned relative to said first storage cluster, said storage clusters each including a plurality of horizontally extending self training idler assemblies arranged in spaced overlying relation with each other, said conveyor belt return reach laced around alternate idler assemblies on said first and second storage clusters beginning with the lowermost idler assembly on said second storage cluster and terminating with the uppermost idler assembly on said first storage cluster and forming a plurality of horizontal storage loops in said return reach, means to maintain said second storage cluster in fixed spaced relation with said first storage cluster, said last named means including means to move said second storage cluster away from said first storage cluster to thereby increase the length of said storage loops in said return reach and reduce the length of said conveying reach, said movable self propelled loading terminus arranged to move away from said discharge terminus and thereby increase the length of said conveying reach and concurrently move said second storage cluster toward said first storage cluster to decrease the length of said storage loops, and driving means including a pair of belt engaging drive pulleys for said conveyor belt positionable at variable distances from, and securable in fixed spaced relation to, said discharge terminus, said driving means including a pair of drive pulleys positioned adjacent said first storage cluster and movable therewith, said drive pulleys having said return reach placed therearound and arranged to pull said conveyor belt around said head pulley.

4. In an extensible belt conveyor the combination comprising a movable self propelled loading terminus, an arch shaped discharge terminus, a pair of longitudinally spaced flexible strands secured at one end to the upper portion of said arch shaped discharge terminus and secured to said loading terminus, means to support said flexible strands along their length, a plurality of spaced troughing idler assemblies secured to said spaced strands, an endless flexible conveyor belt extending between said termini, said conveyor belt having an upper conveying reach supported by said spaced troughing idler assemblies and a lower return reach, said arch shaped discharge terminus having a head pulley secured thereto in elevated position relative to said loading terminus with said conveyor belt extending therearound, said conveying reach and said flexible strands having a section sloping upwardly toward said head pulley, belt storage means physically separated from said discharge terminus, said belt storage means positionable at variable distances from, and securable in fixed spaced relation to, said discharge terminus positioned beneath said sloping section of said conveying reach, said belt storage means including a plurality of loops and said return reach arranged to be payed out to increase the length of said conveying reach, and power operated belt driving means including belt engaging drive pulleys positionable at variable distances from, and securable in fixed spaced relation to, said discharge terminus secured between said pulley and said belt storage means, said belt driving means constructed and arranged to pull said conveyor belt around said head pulley.

5. In an extensible belt conveyor system the combination comprising a movable self propelled loading terminus, an arch shaped discharge terminus, a pair of longitudinally spaced flexible strands each secured at one end to the upper portion of said arch shaped discharge terminus and having their intermediate portion secured to said loading terminus and terminating in a pair of storage spools, an endless flexible conveyor belt extending between said termini, said conveyor belt having an upper conveying reach and a lower return reach, said arch shaped discharge terminus having a head pulley secured thereto in elevated position relative to said loading terminus with said conveyor belt extending therearound, said conveying reach and said flexible strands having a section sloping upwardly toward said head pulley, track mounted belt storage means physically separated from said discharge terminus, said belt storage means positionable at variable distances from, and securable in fixed spaced relation to, said discharge terminus positioned beneath said sloping section of said conveying reach, said belt storage means including a first storage cluster and a second storage cluster, said storage clusters each having a base member supported by a plurality of wheels, said wheels mounted on a pair of tracks extending substantially parallel to said flexible strands, said storage clusters each having a vertical supporting member with a plurality of self training idler assemblies hingedly secured thereto and extending horizontally therefrom, said self training idler assemblies on each of said storage clusters arranged in overlying spaced relation to each other, said first and second storage clusters arranged in spaced relation to each other beneath said conveyor belt sloping section with said self training idler assemblies on each of said storage clusters extending toward each other, said conveyor belt return reach laced around alternate self training idler assemblies on said first and second storage clusters beginning with the lowermost self training idler assembly on said second storage cluster and terminating with the uppermost self training idler assembly on said first storage cluster to form a plurality of horizontal storage loops in said conveyor belt return reach, said movable self propelled loading terminus arranged to move away from said discharge terminus and pull said flexible strands in said pair of storage spools into said extensible belt conveyor system, said second storage cluster arranged to move toward said first storage cluster upon movement of said self propelled loading terminus away from said discharge terminus to decrease the length of said storage loops between said first and second storage clusters and to thereby increase the length of said conveying reach, and power operated belt driving means including belt engaging drive pulleys positionable at variable distances from, and securable in fixed spaced relation to, said discharge terminus secured between said head pulley and said belt storage means, said belt driving means fixed to said belt storage means first storage cluster, said belt driving means constructed and arranged to pull said conveyor belt around said head pulley.

6. In an endless belt conveyor the combination comprising a loading terminus, a discharge terminus, a flexible endless conveyor belt extending between said termini, said discharge terminus having an arched upper portion and a plurality of depending legs, said discharge terminus adapted to straddle other conveying means, a head pulley operatively secured to said arched upper portion of said discharge terminus and having said endless conveyor belt extending therearound, means to adjust said head pulley relative to said discharge terminus to thereby align said conveyor belt, and power operated belt driving means including belt engaging drive pulleys positionable at variable distances from said discharge terminus secured in fixed spaced relation to said discharge terminus.

7. In an endless belt conveyor the combination comprising a loading terminus, a discharge terminus, a flexible endless conveyor belt extending between said termini and having a conveying reach and a return reach, said discharge terminus having an arched upper portion and a plurality of depending legs, said discharge terminus adapted to straddle other conveying means that extends transversely to said reaches of said endless belt conveyor, a head pulley carrier member arranged to be detachably secured to said discharge terminus arched upper portion, a head pulley operatively secured to said head pulley carrier member and adapted to have said endless conveyor belt extend therearound, means to adjust said head pulley carrier member relative to said discharge terminus to thereby adjust said head pulley and align said conveyor belt reaches, and power operated belt driving means including belt engaging drive pulleys positionable at variable distances from said discharge terminus secured in fixed spaced relation to said discharge terminus.

8. In an endless belt conveyor the combination comprising a loading terminus, a discharge terminus, a flexible endless conveyor belt extending between said termini, said discharge terminus having a pair of spaced arch members each having a pair of depending legs, said discharge terminus adapted to straddle other conveying means that extends transversely to the reaches of said endless belt conveyor, means to secure said pair of arch members to each other in spaced upright relation, a head pulley frame member including a pair of spaced side members, lateral connecting members arranged to secure said side members in fixed spaced relation to each other, a head pulley operatively secured to said head pulley frame side members and adapted to have said endless conveyor belt extend therearound, a pair of horizontal supporting members secured to said arch members adjacent the upper curved portion of said arch members, said head pulley frame side members arranged to be secured to said pair of horizontal supporting members thereby positioning said head pulley above said other conveying means, a flygate chute secured to said head pulley frame member in fixed spaced relation to said head pulley, means to adjust said head pulley frame relative to said arch members to thereby align said conveyor belt on said head pulley, and power operated belt driving means including belt engaging drive pulleys positionable at variable distances from said discharge terminus secured in fixed spaced relation to said discharge terminus.

9. An extensible endless belt conveyor, the combination comprising a loading terminus, a discharge terminus, and an endless flexible conveyor belt extending between said termini, a portable belt storage cluster physically separated from said discharge terminus and having a base member mounted on a plurality of propelling wheels, said storage cluster positionable at variable distances from said discharge terminus and secured in fixed spaced relation to said discharge terminus, a carrier member secured to said base member and extending upwardly therefrom, and a plurality of self training idler assemblies hingedly secured to said carrier member in spaced relation to each other and arranged to have portions of said conveyor belt extend therearound, said hingedly secured idler assemblies providing a self-training action to said belt portions extending therearound.

10. An extensible endless belt conveyor, the combination comprising a loading terminus, a discharge terminus and an endless flexible conveyor belt extending between said termini, a portable belt storage cluster physically separated from said discharge terminus and adapted to support a plurality of belt storage loops thereon, said storage cluster positionable at variable distances from said discharge terminus and secured in fixed spaced relation to said discharge terminus, said storage cluster having a base member mounted on a plurality of propelling wheels, a vertical carrier member secured at one end to said base member and extending upwardly therefrom, a plurality of hinge members extending horizontally from said carrier member in spaced relation to each other, and a plurality of self training idler assemblies secured to said hinge members, said idler assemblies including a yoke member having a pair of arm portions, said yoke member being hingedly secured to said carrier member and arranged to pivot in a horizontal plane, an idler pulley operatively secured to said yoke member and arranged to have said conveyor belt extend therearound, and a plurality of upright guides secured to said yoke arm portions and arranged to guide said endless belt therebetween.

11. In an endless belt conveyor the combination comprising a loading terminus, a discharge terminus, a flexible endless conveyor belt extending between said termini, said discharge terminus including an arch structure having a plurality of ground engaging legs adapted to straddle other conveying means, a head pulley rotatably secured to said arch structure and having said endless conveyor belt extending therearound, said discharge terminus so constructed and arranged that it is readily assembled and dis-assembled so as to be portable, and power operated belt driving means including belt engaging drive pulleys positionable at variable distances from said discharge terminus, said driving means secured in fixed spaced relation to said discharge terminus.

12. In an endless belt conveyor the combination comprising a loading terminus, a discharge terminus, a flexible endless conveyor belt extending between said termini, said discharge terminus including an arch structure having a plurality of ground engaging legs adapted to straddle other conveying means, means to secure said arch structure against movement relative to said other conveying means, a head pulley rotatably secured to said arch structure and having said endless conveyor belt extending therearound, power operated belt driving means including a belt drive frame and belt engaging drive pulleys positionable at variable distances from, and securable in fixed spaced relation to, said discharge terminus, and means operable to provide final adjustment between said head pulley and said drive pulleys after said arch structure and said drive frame have been secured in place.

References Cited in the file of this patent

UNITED STATES PATENTS

| | | |
|---|---|---|
| 1,659,316 | Enney | Feb. 14, 1928 |
| 1,817,348 | Claghorn | Aug. 4, 1931 |
| 2,393,563 | Petterson | Jan. 22, 1946 |
| 2,678,125 | Bonney | May 11, 1954 |
| 2,774,462 | Poundstone | Dec. 18, 1956 |
| 2,788,116 | Wood | Apr. 9, 1957 |
| 2,808,924 | Wood | Oct. 8, 1957 |
| 2,842,242 | Patterson | July 8, 1958 |

FOREIGN PATENTS

| | | |
|---|---|---|
| 278,972 | Great Britain | Oct. 20, 1927 |